(12) United States Patent
Hume (10) Patent No.: US 6,752,231 B2
(45) Date of Patent: Jun. 22, 2004

(54) PERSONAL TRANSPORTATION SYSTEM (76) Inventor: Ross Gordon McKenzie Hume, 501 Pipeline Road RR#1, Grafton, ON (CA), K0K 2G0

( * ) Notice: Subject to any disclaimer, the term of this patent is extended or adjusted under 35 U.S.C. 154(b) by 33 days.

(21) Appl. No.: 10/259,634

(22) Filed: Sep. 30, 2002

(65) Prior Publication Data
US 2004/0060759 A1 Apr. 1, 2004

(51) Int. Cl.$^7$ .............................................. B62D 61/00
(52) U.S. Cl. ......................... 180/218; 180/6.5; 280/211
(58) Field of Search ........................ 180/218, 6.2, 6.48, 180/6.5, 21, 6.28; 280/205, 210, 211, 206, 207, 208

(56) References Cited

U.S. PATENT DOCUMENTS

| 2,372,043 A | | 3/1945 | Aghnides | |
| 2,909,145 A | | 10/1959 | Hertelendy | |
| 3,313,365 A | * | 4/1967 | Jackson | 180/6.2 |
| 3,718,342 A | | 2/1973 | Freed | |
| 3,876,025 A | | 4/1975 | Green | |
| 3,893,707 A | | 7/1975 | Samsel | |
| 4,237,990 A | | 12/1980 | La | |
| 4,386,787 A | | 6/1983 | Maplethorpe | |
| 4,448,278 A | | 5/1984 | Badsey | |
| 4,505,346 A | | 3/1985 | Mueller | |
| 4,897,070 A | * | 1/1990 | Wagstaff | 446/273 |
| 5,314,034 A | | 5/1994 | Chittal | |
| 5,366,034 A | | 11/1994 | Meyers | |
| 6,298,934 B1 | | 10/2001 | Shteingold | |
| 6,345,675 B1 | * | 2/2002 | Hueber | 180/21 |
| 2002/0011368 A1 | * | 1/2002 | Berg | 180/218 |

* cited by examiner

Primary Examiner—Lesley D. Morris
Assistant Examiner—Tony Winner
(74) Attorney, Agent, or Firm—Dowell & Dowell, P.C.

(57) ABSTRACT

A two wheeled automotive vehicle having a heavily weighted passenger compartment pivotally mounted on, and with its center of gravity below, a trapeze cross bar that is in turn pivotally mounted between axially aligned stub axles for the road wheels. Attitude control is provided and other function for controlling the reactive forces of braking is also disclosed.

8 Claims, 8 Drawing Sheets

PRIOR ART

FIG. 8

PERSONAL TRANSPORTATION SYSTEM

FIELD OF INVENTION

This invention relates to a motorized personal transportation vehicle, and more particularly to a two-wheeled urban transportation vehicle powered by two electric gear motors.

BACKGROUND OF INVENTION

Four wheeled automotive passenger carrying vehicles have, of course, been provided for over one hundred years and have developed into highly efficient machines for transportation of people and goods rapidly over long and short distances. They are not, however, without their disadvantages. They are noisy, often difficult to park in congested urban areas and, being powered by internal combustion engines fuelled by gasoline or diesel oil, major sources of atmospheric pollution. There is, therefore, a need for a small light, fully enclosed, passenger vehicle, preferably but not essentially electrically powered, for use in congested urban areas to transport up to two adults and a limited amount of goods in safety in substantially all weather conditions. Numerous attempts have been made in the past to provide such vehicles, with varying degrees of success, ranging from three wheeled vehicles based on gasoline powered motorcycles to two wheeled machines, sometimes gasoline but also electrically powered, such as that shown in U.S. Pat. No. 5,366,034 issued Nov. 22, 1994 to William L. Meyers. In the Meyers vehicle a passenger compartment is pivotally suspended between two very large wheels mounted at the ends of a single axle that is perpendicular to the direction of travel. The passenger compartment is pivotally mounted beneath the axle so as to allow the compartment to rotate repeatedly in an uncontrolled and unconstrained manner about the axle upon impact of the vehicle with another object. Such a design dictates that all passengers must be securely strapped into their seats in the same manner as an airforce fighter pilot, and all goods must be secured against all movement to prevent injury or damage when the passenger compartment rotates through 360°. This design also ignores the potential reactive rotation of the passenger compartment in the everyday event of hard braking, let alone striking an immoveable object. If such rotation occurs, to the considerable discomfort of the passengers, the energy available as the compartment passes over the top and completes the circle in the down direction would increase the speed and severity of any subsequent impact. Further in the Meyers design, the attitude or pitch of the passenger compartment is controlled by wings, in the manner of a bi-plane, the upper one of which is fitted with control tabs, similar to an airplane. As the effectiveness of these wings and tabs is dependent upon the velocity of the air passing over them and the speed of the vehicle, both of which are variable, their effect and reliability are questionable.

OBJECT OF INVENTION

It is, therefore, an object of the present invention to provide an electrically powered two-wheeled passenger vehicle that prevents reactive rotation of the passenger compartment due to extreme or emergency braking and in which the attitude of the passenger compartment is automatically controlled by means of powered weight transfer at the command of a balance sensing unit.

BRIEF STATEMENT OF INVENTION

Thus, by one aspect of this invention there is provided an automotive vehicle having a pair of road wheels each rotatably mounted on a respective one of a pair of axially aligned stub axles;

a trapeze frame, comprising a pair of spaced apart side arms and a horizontal bar mounted therebetween, rotatably mounted between said road wheels and depending from said stub axles;

a weighted passenger compartment rotatably mounted on said horizontal bar and having a centre of gravity below said horizontal bar;

a pair of powered drive motors each operatively connected to a respective one of said road wheels;

means to control said motors, mounted in said passenger compartment;

braking means operatively connected to said road wheels; and means to temporarily reduce braking force in response to angular displacement between said side arms of said trapeze frame and said passenger compartment so as to prevent rotation of said trapeze bar about said axially aligned stub axles.

DETAILED DESCRIPTION OF PREFERRED EMBODIMENTS

Figure 1:
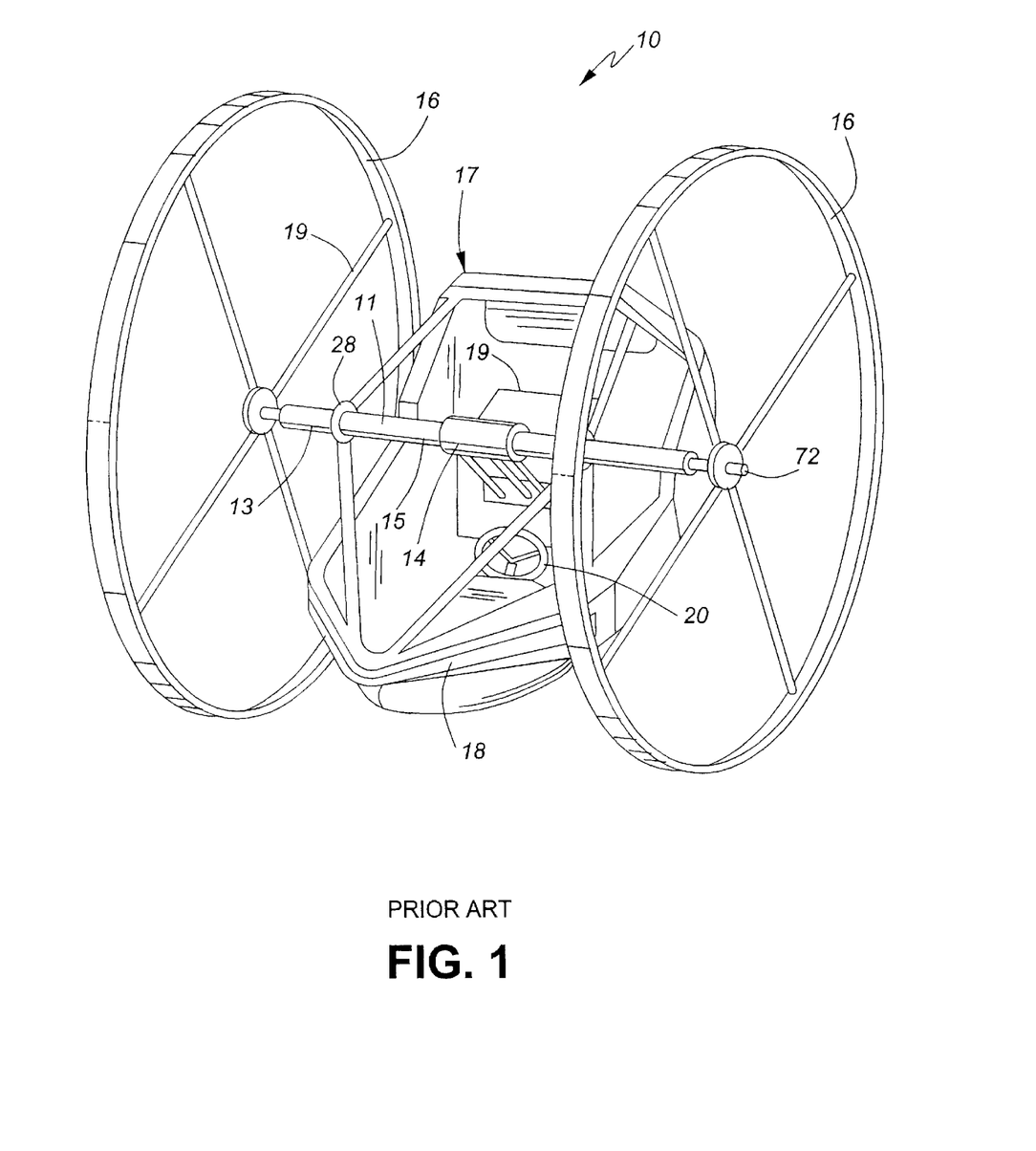
FIG. 1 is a perspective view of a two-wheeled automotive vehicle according to the prior art.

In FIG. 1 there is shown an automotive vehicle 10 as described by Meyers (supra). An axle housing 11 is provided with port 12 and starboard 13 axles. Each is provided with a pair of pulleys 20 at their proximal ends 15 and eight foot diameter drive wheels 16 at their distal ends. Hung from the axle housing 11 is a passenger compartment 17, comprising a frame 18 which has overhead bearings 19 which encircle axle housing 11 and allow the passenger compartment 17 to move in a relatively unconstrained manner 360° about the axle housing 11. Passenger compartment 17 has a centre of gravity below axle 11 and is provided with passenger seats, a steering wheel 20 and a motor/transmission 19. Motor/transmission 19 is connected to pulleys 14 by a plurality of drive belts. In the event of an impact between wheels 16 and a solid object, or between passenger compartment 24 and an object such as an automobile, passenger compartment 17 can freely rotate through 360° and by this means potentially lethal energy of a collision is dissipated through self-extinguishing angular momentum, albeit with considerable discomfort and probable disorientation for the passengers.

Figure 2:
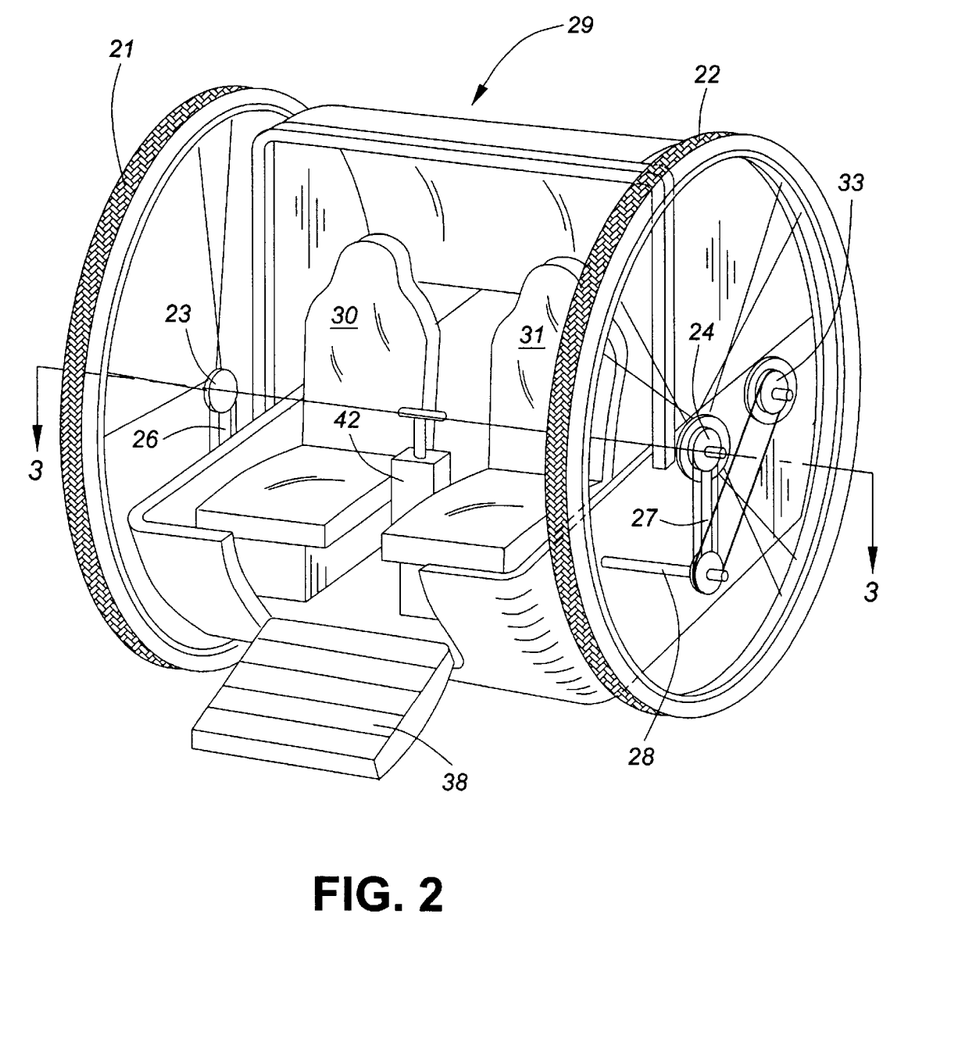
FIG. 2 is a perspective view of a two-wheeled vehicle according to one embodiment of the present invention.
Figure 3:
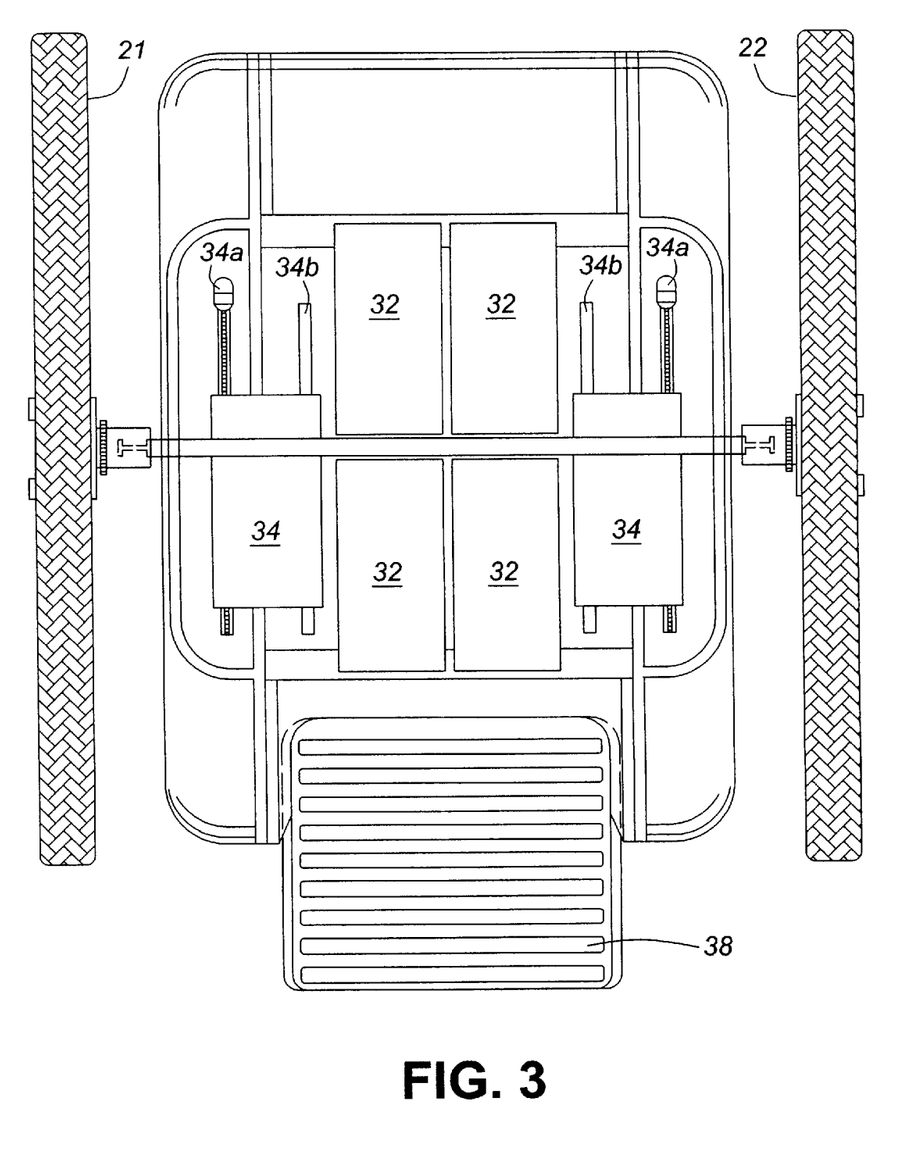
FIG. 3 is a plan view of the embodiment of FIG. 2, taken along section line 3—3.
Figure 4:
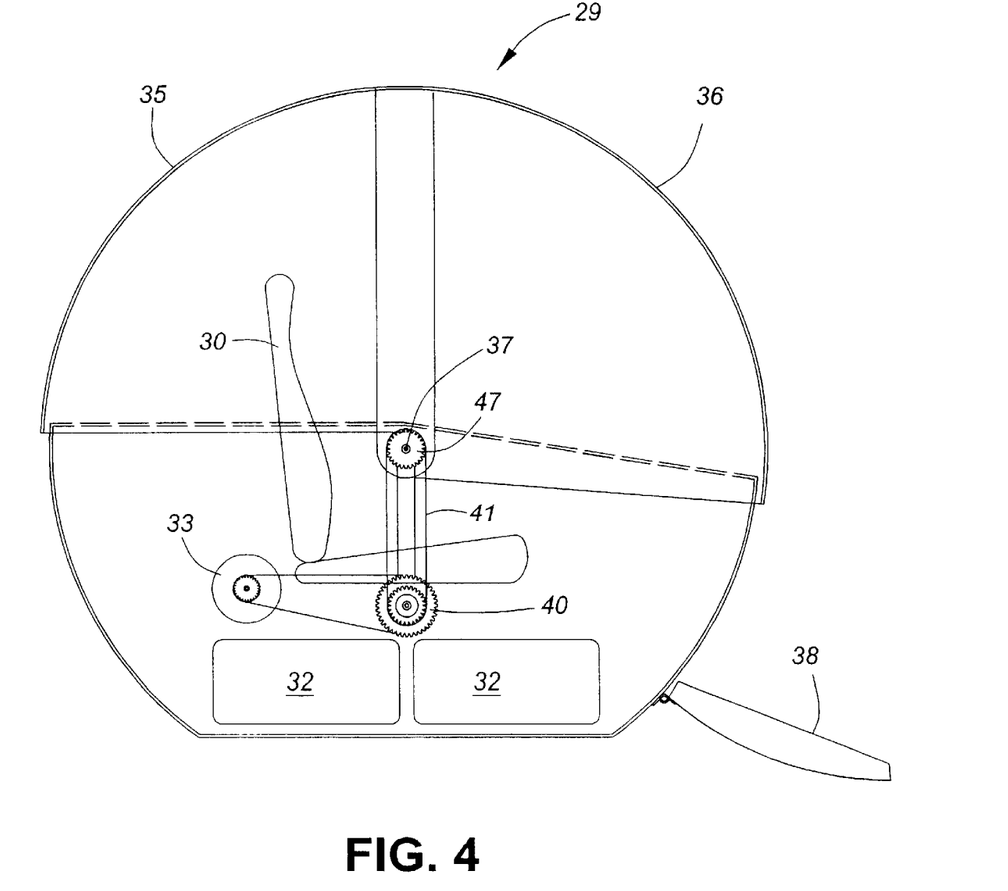
FIG. 4 is a side view of the embodiment of FIG. 2, with the road wheel removed.

In FIG. 2, there is shown an automotive vehicle 200 according to a preferred embodiment of the present invention. Vehicle 200 is provided with a pair of relatively large, generally about six feet in diameter, rubber tired road wheels 21,22 mounted on short stub axles 23,24 respectively. Depending from axles 23,24 is a trapeze 25 comprising rotatable mounted depending arms 26,27 having a crossbar 28 mounted therebetween. A fully enclosed passenger compartment 29 is rotatably mounted on crossbar 28 and includes a pair of passenger seats 30,31 as seen in FIG. 3. A plurality of heavy duty batteries 32, preferably 12 v or 6 v golf cart batteries wired in series or the like, and a pair of DC electric gear motors 33 located above batteries 32 and behind seats 30,31. The geometric center of the passenger compartment 29 is aligned with axles 23,24 and the center of gravity of the crossbar mounted passenger compartment is significantly below the crossbar 28, due to the weight of the batteries 32, thus ensuring that the passenger compartment remains vertical regardless of the angular position of arms 26,27. In a preferred embodiment, as seen in FIG. 3, four fixed batteries 32 are provided centrally. On each side thereof there are also provided a pair of slidably mounted batteries 34, which can be moved forward or backward, on slides 34b, preferably by means of small DC motors 34a to compensate for minor changes in weight distribution of the passengers in seats 30,31 and other loads which may affect the attitude of the passenger compartment.

Figure 5:
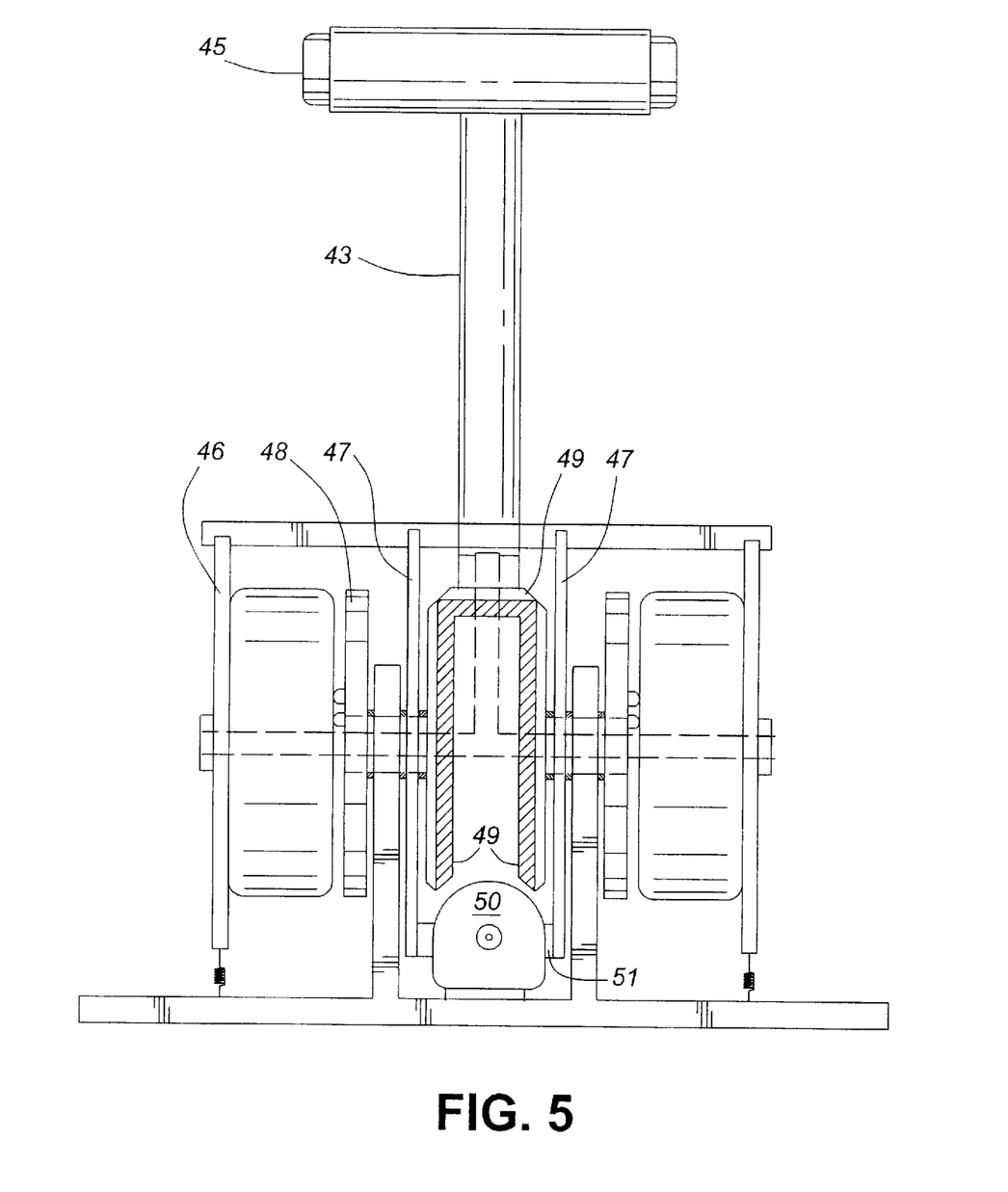
FIG. 5 is a front view of the tee bar joystick in FIG. 2.
Figure 6:
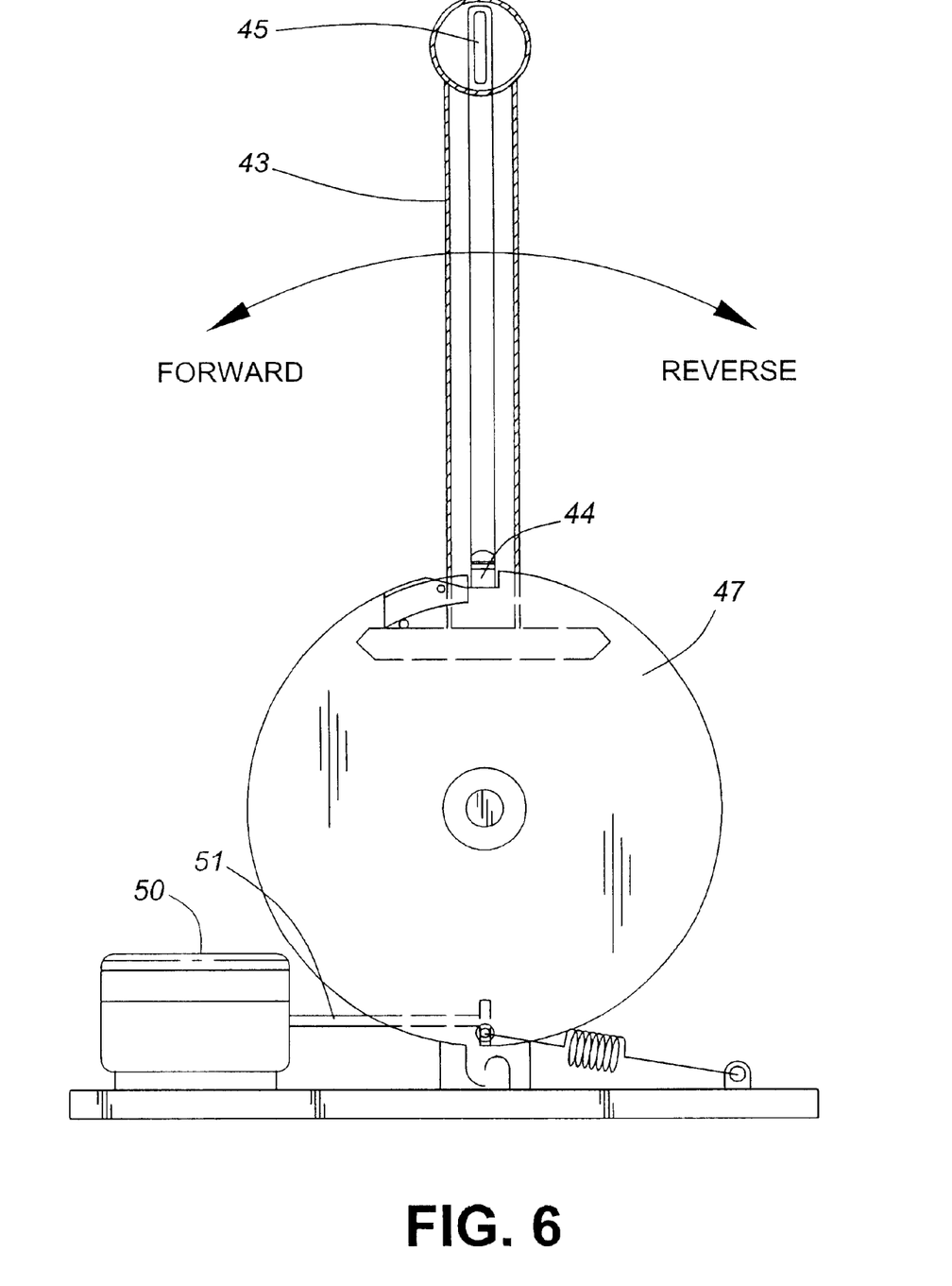
FIG. 6 is a side view of the tee bar joystick of FIG. 5.
Figure 7:
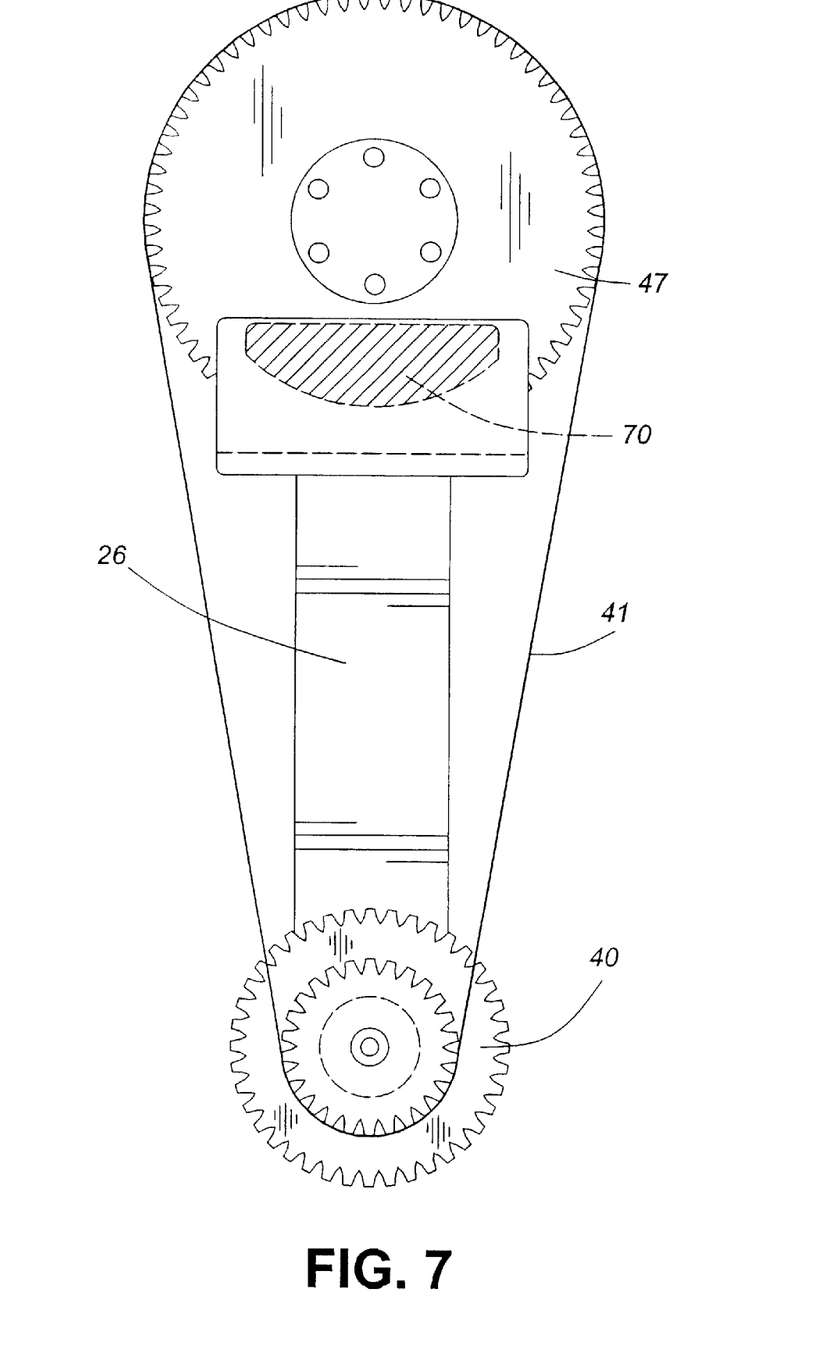
FIG. 7 is a side view, similar to FIG. 4, showing the brake callipers and pads.
Figure 8:
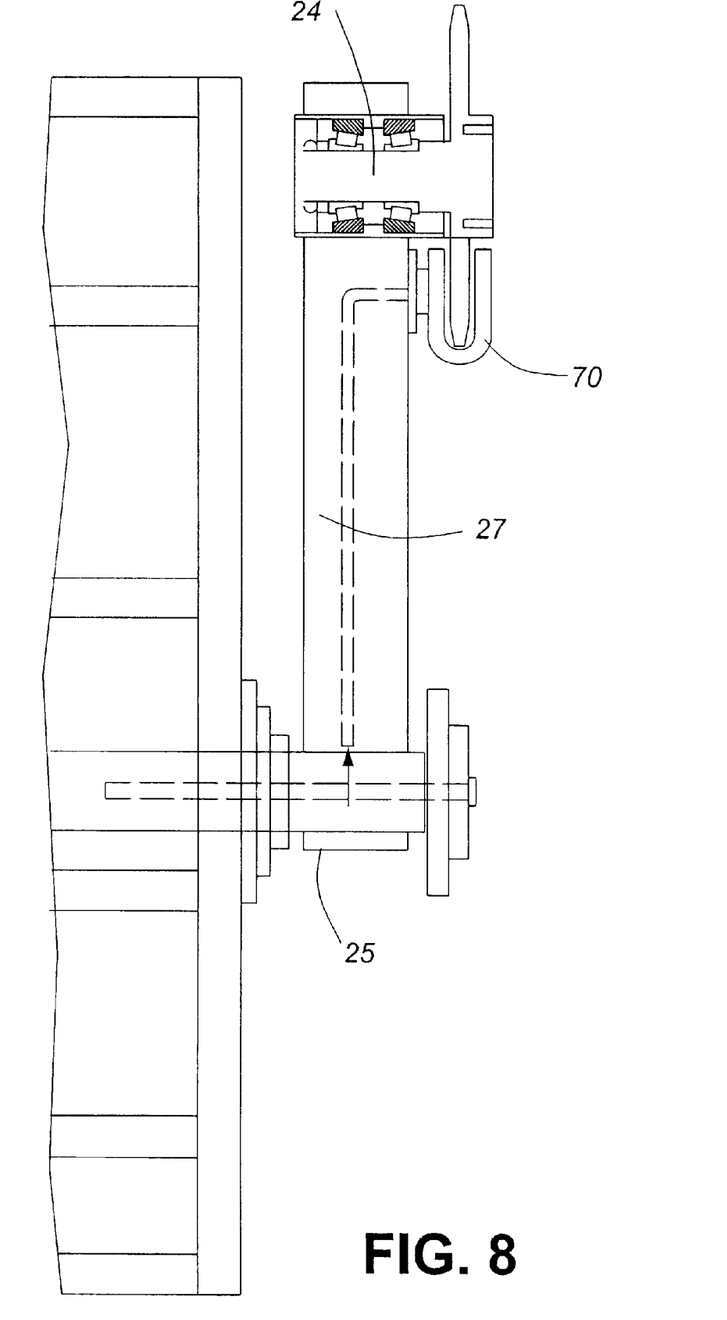
FIG. 8 is a rear view of the brake system shown in FIG. 7.

As noted above, motors 33 are located behind seats 30, 31 and are connected by chains 39 through sprockets 40, chains 41 and sprockets 42 to the wheels 21, 22 which are also provided with hydraulic disc brakes as seen in FIGS. 7 and 8. The motors 33 are independently controlled, so as to provide steering, acceleration and braking of the vehicle, by means of a console 42 mounted on the floor between seats 30, 31 as seen in FIG. 2. Console 42 is provided with a tee bar joystick 43 (FIGS. 5 and 6). Upon pushing the joystick 43 forward, the speed of the drive motors is increased, while pulling back the joystick causes the speed of the motors to decrease. Rotating the joystick to the left increases the speed of the right drive motor and decreases the speed of the left drive motor, thus enabling a turn to the left. The opposite effect is achieved by rotating the joystick to the right. The joystick is designed to operate through a slot in the upper surface of the control console and the system is designed so that the achievable differential in drive motor speed is a variable relative to the forward position of the joystick, with the maximum differential being allowed at the lowest speed and the differential decreasing as the joystick is advanced, and vice-versa. The joystick 43 is retained in the stop position by a detent 44 and this may be released by depression of release button 45 on the T-handle. While the joystick is in the detent position, rotation of the joystick (as shown in FIG. 5) will cause the drive motors to operate in opposite directions and at the same speed, thus allowing rotation of the vehicle about its vertical axis without forward or reverse motion. It will be appreciated that this manoeuvrability of the vehicle is particularly advantageous in congested urban areas.

It will be appreciated by those skilled in the art that, in the event of aggressive or hard braking, there will be a tendency for the trapeze to swing backwards, even though the passenger compartment remains upright at all times as its centre of gravity is always considerably below the axis of the trapeze bar. Means to prevent orbiting of the trapeze bar about the horizontal axis of the drive wheels must, therefore, be provided. At rest, the trapeze hangs directly below the wheel hub centre line and the passenger compartment is coaxially aligned with the wheels. If this position is considered as 0° (i.e. bottom dead centre) then a 90° anticlockwise movement of the trapeze drop arm (when viewed from the left side) represents the point of maximum braking effect or resistance of the vehicle weight to the forward motion of the vehicle. From 90° to 180° (i.e. top dead centre) the effective braking value of the weight decreases, and after 180° the weight will increase forward speed. In order to achieve anti-orbit control, the rotational angle of the trapeze drop arm relative to the passenger compartment is monitored and as the angle reaches a preset value, the hydraulic pressure in the brake system is reduced which causes the angle of the trapeze drop arm to reduce under the weight of the passenger compartment. As the trapeze drop arm angle decreases, so then the pressure in the brake system can be re-established again to achieve maximum allowable braking force.

The disc brakes 70 are applied and controlled by movement of the joystick 43. As previously described, the joystick operates about two axes, one vertical to allow rotation of the main shaft for control of steering, and the other horizontal to allow forward and backward rotational movement of the main shaft for speed control, in the forward and reverse directions and to apply braking. The configuration of the detent 44 is such that as the joystick is returned to and approaches the detent position, the drop bar that engages the detent notches is guided into those notches by guide toggle plates that automatically rise and prevent the drop bar from being accidentally displaced from the detent position once it has been attained. If the joystick is deliberately pulled back past the detent position, with the drop bar still engaged, the brakes will be applied in accordance with the following sequence. The detent notches are set into the top edges of the four circular plates 46, 47 that form the core of the tee bar joystick, two of which (46) form the mounting bases for the drive motor control rheostats (not shown), while the other two (47) are secured together at the bottom in the form of a "U" to provide a control rod 51 which is used to operate the master cylinder 50 when braking is required.

It will be appreciated that while the first pair of plates 46 are rotated by the action of the joystick to effect the motor control functions and the bevel gear set 49 makes it possible to attain differing degrees of rotation of those plates, thus allowing differing RPM of the road wheels 22, that may be required to achieve the steering function as well as general speed control, the braking system uses these components in a different manner.

When braking is in progress, the drop bar 44 forces all four of the plates 46, 47 to rotate in unison, the inner pair 47 to depress the control rod 51 of the master cylinder 50, thus applying hydraulic pressure to the disc brakes 70, and the outer pair 46 to rotate in step with the power supply plates 48 which are permanently secured to, and driven by, the two larger components of the bevel gear set 49.

In normal operation the significantly greater weight below the trapeze cross bar, relative to that above the cross bar, ensures that the passenger compartment remains vertical and properly oriented. This remains true even if maximum or emergency braking effort is applied. As noted above, however, the trapeze drop arms will rotate slightly backwards. The degree of the backward swing will be dependent upon a number of factors, such as the speed of the vehicle; the loaded weight of the vehicle; the uphill or downhill angle of the terrain; and the road conditions. Excessive swing back may be controlled as described hereinafter. When the master cylinder 50 is operated by the joystick 43, hydraulic pressure is applied through a three port mechanical valve (not shown). Preferably, the valve is designed so that oil passage can be provided from either one of two ports to the third, but all three cannot be connected to each other simultaneously. If the first port is opened to either the second or third port, but not at the same time, it is apparent that the two disc brake calliper units can be connected to a tee junction so that each receives the same hydraulic flow and pressure; the tee junction can be connected to the first port and can therefore be accessible to the second or third port but not at the same time; if the hydraulic fluid from the master cylinder is routed through the second port and the normal position of the valve is such that the second port is open, it follows that the brake system will function normally, as long as that condition continues. If the third port is piped back to the reservoir of master cylinder 50, it is apparent that hydraulic pressure in both of the disc brake callipers would be reduced or depleted, but not the pressure locked in the supply line between the master cylinder and the second port of the control valve. This pressure is instantly available as the vehicle weight causes the trapeze to subside as brake pressure subsides. It will also be appreciated that hydraulic brake systems are pressure systems and are only sensitive to flow variance if pressure is affected. For that reason, the third port is reduced in flow capability to the point at which pressure is reduced but very little volume is discharged back to the reservoir. In summary, this system contemplates a valve placement and arrangement together with a mechanical linkage that causes the control valve to switch quickly from one port to the other without overlap should the back swing due to extreme braking approach the set point of the system and returns the normal braking system within five degrees of arc. The set point can be selected between about 45° and 90°.

I claim:

1. An automotive vehicle having a pair of road wheels each rotatably mounted on a respective one of a pair of axially aligned stub axles;

a trapeze frame, comprising a pair of spaced apart side arms and a horizontal bar mounted therebetween, rotatably mounted between said road wheels and depending from said stub axles;

a weighted passenger compartment rotatably mounted on said horizontal bar and having a centre of gravity below said horizontal bar;

a pair of powered drive motors each operatively connected to respective one of said road wheels;

means to control said motors, mounted in said passenger compartment;

braking means operatively connected to said road wheels; and means to temporarily reduce braking force in response to angular displacement between said side arms of said trapeze frame and said passenger compartment so as to prevent rotation of said trapeze bar about said axially aligned stub axles.

2. An automotive vehicle as claimed in claim 1, wherein said drive motors are electric motors.

3. An automotive vehicle as claimed in claim 2 wherein said motors are dc motors.

4. An automotive vehicle as claimed in claim 3 including a plurality of batteries fixedly mounted in said passenger compartment.

5. An automotive vehicle as claimed in claim 4 including passenger compartment attitude control means.

6. An automotive vehicle as claimed in claim 5 wherein said attitude control means comprises weight means adjustably mounted in said passenger compartment.

7. An automotive vehicle as claimed in claim 6 wherein said weight means comprise slidably mounted battery means.

8. An automotive vehicle as claimed in claim 7 including a pair of batteries slidably mounted adjacent said fixedly mounted batteries.

* * * * *